(12) United States Patent
Summers et al.

(10) Patent No.: US 10,645,120 B2
(45) Date of Patent: May 5, 2020

(54) POLICY MANAGEMENT FOR DATA MIGRATION

(71) Applicant: Amazon Technologies, Inc., Reno, NV (US)

(72) Inventors: Carl Wesley Summers, Bainbridge Island, WA (US); Jonathan Jorge Nadal, Seattle, WA (US); Praveen Kumar Gattu, Redmond, WA (US); Syed Omair Zafar Gillani, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/863,804

(22) Filed: Sep. 24, 2015

(65) Prior Publication Data

US 2017/0093913 A1    Mar. 30, 2017

(51) Int. Cl.
*H04L 29/06*       (2006.01)
*G06F 21/62*       (2013.01)
(Continued)

(52) U.S. Cl.
CPC ............ *H04L 63/20* (2013.01); *G06F 21/604* (2013.01); *G06F 21/6236* (2013.01);
(Continued)

(58) Field of Classification Search
CPC ....... H04L 63/20; H04L 63/105; H04L 67/10; H04L 63/08
(Continued)

(56) References Cited

U.S. PATENT DOCUMENTS 6,735,699 B1 *   5/2004   Sasaki ................... G06F 21/10
                                                        705/59
8,813,225 B1 *   8/2014   Fuller .................... H04L 63/10
                                                        726/23
(Continued)

FOREIGN PATENT DOCUMENTS

EP          0715243         6/1996
EP          3353701         8/2018
(Continued)

OTHER PUBLICATIONS

"International Search Report dated Dec. 21, 2016" received in PCT/US2016/053158.
(Continued)

*Primary Examiner* — Lynn D Feild
*Assistant Examiner* — Abdullah Almamun
(74) *Attorney, Agent, or Firm* — Hogan Lovells US LLP

(57) ABSTRACT

A customer of a resource provider environment can apply policies at the data object level that will live with a data object during its lifecycle, even as the object moves across trusted boundaries. A customer can classify data, causing tags and/or predicates to be applied to the corresponding data object. Each tag corresponds to a policy, with predicates relating to various actions that can be performed on the data. A chain of custody is maintained for each data object, such that any changes to the object, tags, or policies for the data can be determined, as may be required for various audit processes. The support of such policies also enables the resource provider environment to function as an intermediary, whereby a third party can receive the data along with the tags, policies, and chain of custody as long as the environment trusts the third party to receive the data object.

20 Claims, 8 Drawing Sheets

(51) Int. Cl.
*H04L 29/08* (2006.01)
*G06F 21/60* (2013.01)

(52) U.S. Cl.
CPC ............ *H04L 63/08* (2013.01); *H04L 63/105* (2013.01); *H04L 67/10* (2013.01); *G06F 2221/2101* (2013.01); *G06F 2221/2107* (2013.01); *G06F 2221/2115* (2013.01); *G06F 2221/2141* (2013.01)

(58) Field of Classification Search
USPC .............................................. 726/1
See application file for complete search history.

(56) References Cited

U.S. PATENT DOCUMENTS

| | | | | |
|---|---|---|---|---|
| 2002/0023219 A1* | 2/2002 | Treffers | ................... | G06F 21/10 713/176 |
| 2002/0077985 A1* | 6/2002 | Kobata | ................... | G06F 21/10 705/51 |
| 2003/0004880 A1* | 1/2003 | Banerjee | ............. | G06F 17/3089 705/51 |
| 2003/0079133 A1* | 4/2003 | Breiter | .................... | G06F 21/10 713/182 |
| 2003/0154265 A1* | 8/2003 | Raffaele | ............ | G06F 17/30902 709/221 |
| 2003/0167236 A1* | 9/2003 | Stefik | ...................... | G06F 21/10 705/51 |
| 2009/0106816 A1* | 4/2009 | Ito | ........................... | G06F 21/10 726/1 |
| 2009/0193257 A1* | 7/2009 | Sweazey | ............... | H04L 9/0894 713/176 |
| 2012/0166604 A1* | 6/2012 | Fortier | ................ | H04L 41/0893 709/223 |
| 2012/0330733 A1* | 12/2012 | Tiller | ..................... | G06Q 10/10 705/14.4 |
| 2014/0040134 A1* | 2/2014 | Ciurea | ................ | G06Q 20/383 705/44 |
| 2015/0227754 A1* | 8/2015 | Boss | .................... | G06F 21/6218 707/785 |

FOREIGN PATENT DOCUMENTS

| | | |
|---|---|---|
| WO | 97/03572 | 8/1997 |
| WO | 97/30575 | 8/1997 |
| WO | 2017053597 | 3/2017 |

OTHER PUBLICATIONS

Office Action issued in EP Application No. 16784609.6 dated Apr. 3, 2019.
International Preliminary Report on Patentability dated Mar. 27, 2018 in PCT application No. PCT/US2016/053158.

* cited by examiner

POLICY MANAGEMENT FOR DATA MIGRATION

BACKGROUND

Users are increasingly causing data to be stored in resource environments offered by various resource providers, those environments often referred to as part of "the cloud." This has many advantages, as users such as enterprise users are looking to hybrid storage systems that combine their existing on-premises storage solutions with the agility of the cloud in order to meet their dynamic business needs. The user often will have policies regarding how data is stored and managed within the user environment, and a resource provider will often have different policies for data storage and management in their environment. Use policies are typically enforced at the on-premises storage devices themselves, and migrating at least some of this data to the cloud adds the complication that conventional approaches do not also allow for migration and enforcement of the accompanying user policies. In many instances the cloud storage environment will not have a mechanism for mapping or translating the user policies to the policies supported in the cloud storage environment.

BRIEF DESCRIPTION OF THE DRAWINGS

Various embodiments in accordance with the present disclosure will be described with reference to the drawings, in which.

DETAILED DESCRIPTION

Figure 1:
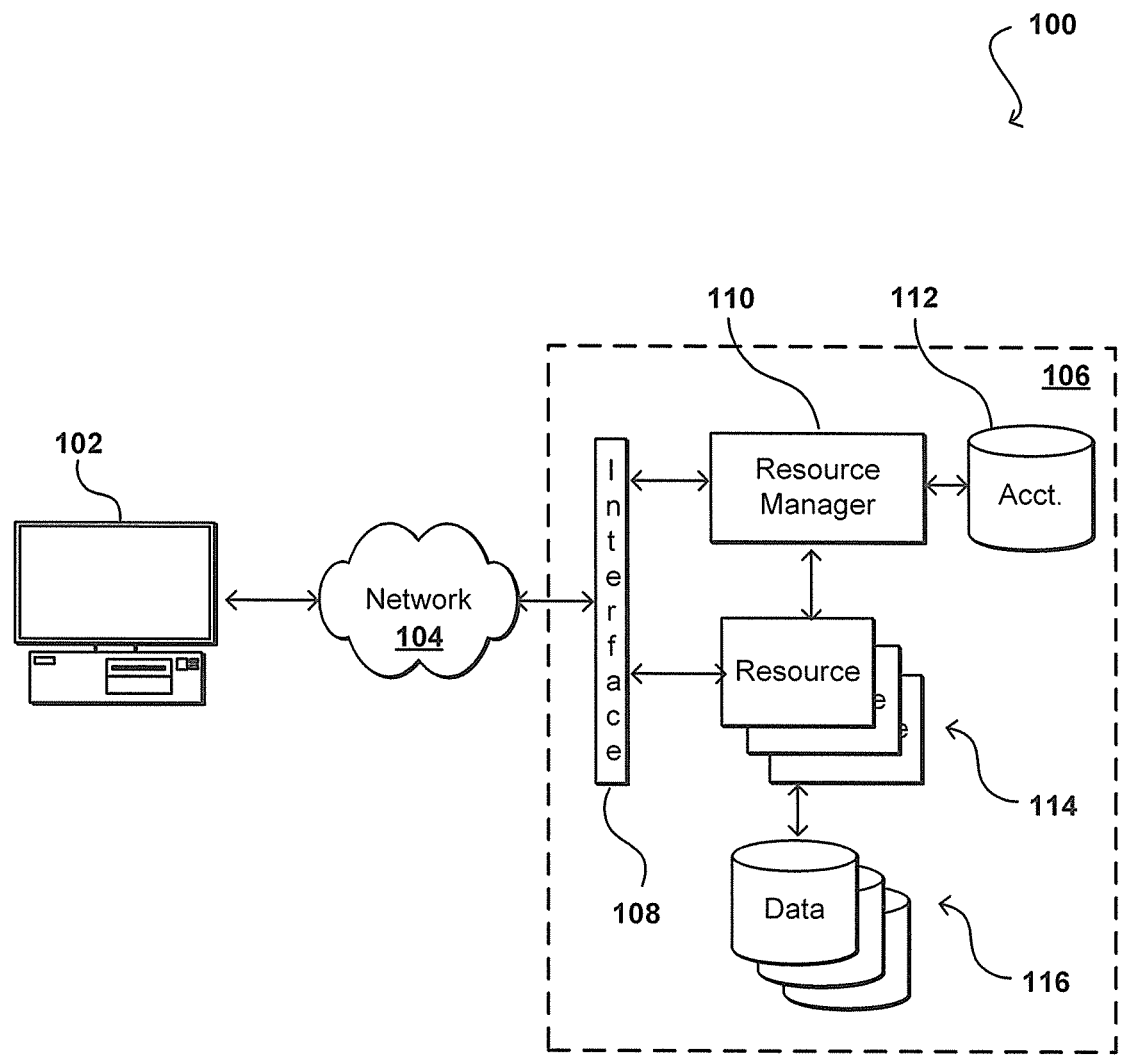
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access and actions with respect to data stored in various environments. In at least some embodiments, tags can be applied at the data object level, where the tags are each associated with a policy written with respect to access and use of the data, such as who can access the data, where the data can be accessed, and how the data can be utilized. These tags can be tied to a data object throughout its lifetime, even as the data is moved between locations within an environment or between environments (i.e., into the cloud), where the data is transmitted across at least one trust boundary. The tags can be immutable or mutable, where mutable tags are only modifiable by certain trusted and authorized entities. The tags can be automatically generated or assigned based on predicates (i.e., filename, date, other metadata) that is applied to the files and/or policies during communication to the remote storage system. An envelope that describes the policy can also be associated with the data object and communicated with it to the cloud storage system, which for example can allow a deny of a PUT of a data object that violates a different policy associated with the bucket (or other repository) receiving the policy at the cloud storage system. Such use of policies can allow a cloud storage system or service to become a trusted intermediary for policies, whereby the service can attempt to enforce that policy against violation by a receiving party.

As data moves across trusted boundaries from on-premises storage devices of a user environment to a remote data storage service, the user can be provided with a mechanism to enable the categorizations and policies to migrate and live with the data. A policy migration service can be used to enforce existing policies in other environments, such as a cloud environment, to ensure compliance, security, and IT governance. Such a service can also ensure polices move with the data as the data moves outside of the cloud environment. In addition to policy migration, a chain of custody of the data can be maintained and migrated with data as well. A chain of custody can include a detailed audit log for the data, as well as of any policies or tags applied to the data. The resource provider environment can be configured to import and export the chain of custody along with the policies that apply to the data.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes.

In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager, authorization manager 110, or other such system, service, or component configured to manage user accounts and information. A component such as a resource manager can also handle tasks such as resource provisioning and usage, and other such aspects. An authorization manager 110 receiving information for the request can perform tasks such as to authenticate an identity of the user submitting the request, as well as to determine whether that user has an existing account with the resource provider, where the account data may be stored in at least one account data store 112 or other such repository in the provider environment. A user can provide any of various types of credentials in order to authenticate an identity of the user to the provider. These credentials can include, for example, a username and password pair, biometric data, a digital signature, or other such information. The provider can validate this information against information stored for the user in the account data store 112. If the user has an account with the appropriate permissions, status, etc., information can be passed to the resource manager, which can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager, at least until such time as a relevant aspect of the user account changes, the user is no longer granted access to the resource, or another such aspect changes.

The resource manager (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
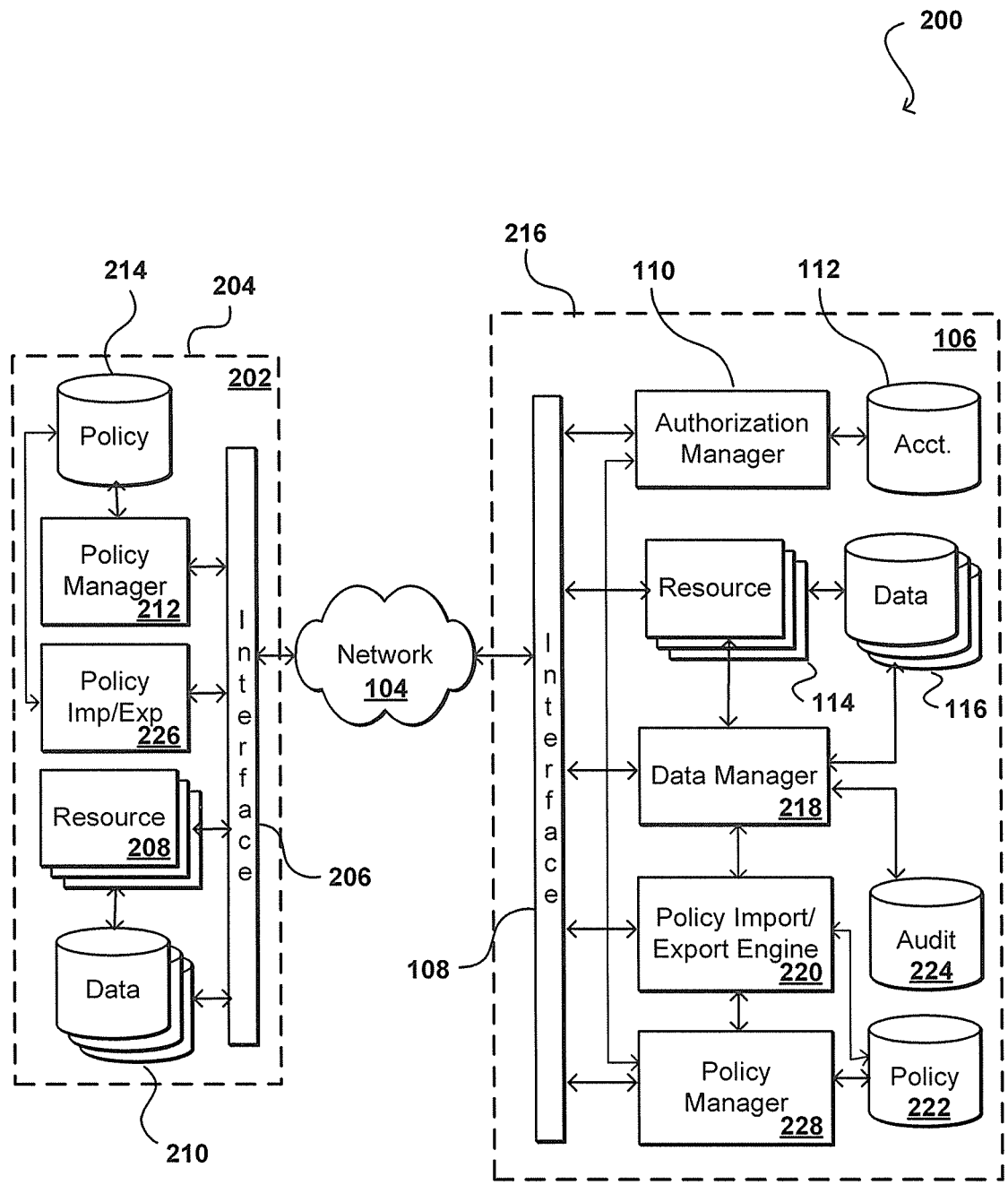
FIG. 2 illustrates an example environment where policy import/export engines can enable the management of policies for data migration between a user environment and a resource provider environment that can be utilized in accordance with various embodiments.

As mentioned, a customer of such a resource environment might have data that is stored within on-premises data storage devices, such as the data stores 210 illustrated in the user environment 202 of the example situation 200 of FIG. 2. The data is stored within a trusted boundary 204 of the customer environment, and can be processed using various resources 208 (e.g., physical or virtual servers) of the user environment 202. The data can be managed using various policies that can be administered by a policy manager 212 and stored in a policy database 214 or other such location. A policy manager in general can refer to a system, service, or component that performs tasks such as creating policies, associating policies with objects, maintaining the associations, providing access to policies, and other such tasks. Users can write policies such as predicate-based policies and lifecycle-based policies, wherein specific actions will be performed for objects with certain tags according to certain predicate-based policies (different policies can apply for different actions) and wherein a determined action will be performed for all objects with a specific tag for lifecycle-based policies.

Requests for access to the data or transmissions including portions of the data can be sent through an interface layer 206, such as those discussed above with respect to FIG. 1. It should be noted that reference numbers may be carried over between figures for similar elements for purposes of simplicity of explanation, but such usage should not be interpreted as a limitation on the scope of the various embodiments unless otherwise specifically stated. The policies used to manage data in the user environment 202 are often enforced at the level of the storage devices themselves. If the user wants at least some of the data in the data stores 210 to be migrated to data stores 116 in the resource provider environment 106, whether for redundancy or alternative storage options, the user will have no way under conventional approaches to migrate the policies with the data. As mentioned, a resource provider environment typically will have no way of mapping the user policies to the policies supported in the resource environment. Further, the resource provider environment may not have any way of ensuring enforcement of the user policies in the resource environment or after export of the data to a third party.

Accordingly, approaches in accordance with various embodiments can enable a user to apply one or more tags to a particular set, group, or collection of data, or a data object or data file, where those tags can be associated with policies and be immutably tied to the particular data that is migrated to the provider environment 106. These tags can be automatically generated by software in the user environment, such as by a policy import/export engine 226 or similar component that can perform tasks such as to monitor the exportation of data, or be contacted in the event of an export, etc., and cause the appropriate tag(s) to be applied. As mentioned, a tag can be an instance of metadata, a property, or another such indicator that can be mutably or immutably tied to a data object. These tags can be tied to a data object throughout its lifetime, even as the data is moved between locations within an environment or between environments (i.e., into the cloud), where the data is transmitted across at least one trust boundary. The tags can be automatically generated or assigned based on predicates (i.e., filename, date, other metadata) that is applied to the files and/or policies during communication to the remote storage system.

A policy import/export engine (or separate import and export engines) can refer generally to one or more systems, services, or components that are configured to perform tasks such as the importing and exporting of policies, as well as determining whether those policies are able to be imported or exported, determining any conflicts, verifying ownership or access to various policies for import/export purposes, and the like. In some embodiments the tags are assigned based upon predicates, such as filename, date, or other metadata, that is applied to the files and/or policies during transmission of the data to the resource provider environment 106. In other embodiments, an envelope can be generated for the transmission of data, where that envelop describes the policy to be associated with the data. The envelope can then be transmitted with the data, such as may "include" or "wrap" the data in the envelope, for receipt and processing by the resource provider environment. As will be discussed subsequently, the tags and/or envelope can then be processed by a component such as a policy import/export engine 220 of the resource environment. The policy import/export engine 220 can determine the "cloud" policies, or policies of the resource provider environment 106, that apply to the bucket or other location for which the user data is to be stored, and if the data and/or user policies violate a policy associated with the bucket then a PUT or similar operation can be denied. In at least some embodiments, the policy import/export engine 220 can work with a policy manager 228, or other such component, system, or service that manages policies on behalf of the resource provider environment 106. In some embodiments the policy manager works with the authorization manager 110 or other such components to determine authorizations of the user in addition to policies to be applied to such usage. This can include, for example, which policies to apply for a specific task to be performed on behalf of a user. In some embodiments, federated identities can be used, as may be provided by various third parties, in order to determine the appropriate authorizations, policies, etc.

The usage of tags with data enables a user to utilize policy-based management capabilities to curate their data as it moves between the customer environment 202 and the resource provider environment 106. The ability to tag data enables the user to be able to track, identify, and/or categorize the data, as well as to understand how that data is being used. A users can then leverage this data classification and tag approach tags to write and/or select polices to be used in managing the data within the customer environment 202, within the resource provider environment 106, and at other locations that might obtain access to the data. Once a policy is applied using these tags, the policy should be automatically enforced in the environment or on the storage platform where the data resides. The ability to categorize data enables data management based on factors such as compliance requirements, information technology (IT) governance, and security policies that apply for a given user (i.e., enterprise). For example, a user can categorize a set of data as "log" data. The user can then manage all data that falls within this category using a specified set of policies. Data categorized in a separate category, such as "financial critical" data, may be subject to a different set of management policies, as may be specified by contract or otherwise. Users today rely on their on-premises storage devices 208, 210 to support policy enforcement and management. As users move their data to resource provider environments 106 (and back), the approaches presented herein can provide a way for the user to ensure the specified data classifications and policies move with the data.

Users can be provided with the ability to tag and classify data using custom tags. Any given object stored in the resource provider environment 106 can have one or more custom tags, which can be managed by a data manager 218 and determined using a policy import/export engine or other such component(s). In various embodiments, data object tags can be of two types: mutable and immutable. Mutable tags can be changed at any time during the lifecycle of a data object, with access being controlled (i.e., only federated identities or other authorized identities can have access to edit or change a tag). Immutable tags cannot be removed from a data object or changed once applied to a data object. Object tag access is controlled by the data manager 218, and similar components in other environments, such that only authorized users or groups can edit tags. The ability to enable users to tag and classify data is important in at least some embodiments as it can be impossible, or at least difficult, for the resource provider to attempt to predict the different ways customers would want to author data management policies.

In order to provide the necessary flexibility for users, management policies can be able to be specified for individual data objects. In the example of data on a file system, users manage permissions and metadata on individual files. Managing individual files, however, becomes increasingly difficult as the number of files grows. Similarly, users can be provided with the ability to write data management policies based on the data classifications (tags) specified at the object level. Such ability enables users to exercise more control and better manage their data in the resource provider environment 106, as may simplify data management. An example includes the writing of a cross-region replication policy based on a custom tag for sensitive user data. However, having policies on custom object level tags may not be sufficient in at least some embodiments. In order to provide a truly customizable policy engine 220, the provider environment 106 can, in at least some embodiments, also support the incorporation of predicate-based triggers. These triggers can include actions such as GET, PUT, and DELETE, for example, that a user can perform on a specified data object. The ability to pivot data management policies on predicates enables customers to write much more effective policies to control on their data. The policy engine 220 can combine object-level custom tags, custom polices, and predicate-based triggers to enable policy-driven data management. Example policies could specify to "only allow GET operations on objects tagged with 'legal hold' if the user accessing the data object is part of a specified group," for example, or "for objects tagged with 'EU' only allow writing to buckets within EU regions," among other such options.

Tags can also be used to track information across the lifecycle of a data object. If a data object is copied and/or moved to a specified location, information such as the classification, applied tags, and the respective policies for that data object need to move with the data object. Keeping this information together with the data object ensures that information can be tracked across the lifecycle even when data moves across trust boundaries 204, 216. For example, an object can be moved to the resource provider environment 106, then copied to a different bucket after applying some transform by creating a secondary data object. The category (i.e., tag) for this data object will need to be copied as well as the policy, even though the second data object may be a copy. Such requirements enable customers to follow the information across its lifecycle and ensure that the appropriate policies are applied. The editing or removal of a policy can be performed only by a user who has explicit permission to edit object policy, and this change can be logged appropriately.

The policy import/export engine 220 can provide access control to manage permissions for the adding, editing, and removal of tags and policies for data object stored in the data stores 116 of the resource provider environment 106. The engine in at least some embodiments can ensure that only authorized users have the ability to change policies on a data object, and that any changes are documented and/or logged for future reference. Various embodiments can also attempt to simplify the creation and management of policy, as users may need the ability to control policies at the object level, but creating a separate policy for every single object will generally not be a manageable solution in at least most circumstances. Instead, the ability to combine a predicate with a tag can enable users to create policies and apply them to specific data objects.

As the data moves across the trusted boundaries 204, 216 from the on-premises storage devices 210 of the user environment 202 to the data storage resources 116 of the resource provider environment 106, the users will need a way to transfer the applicable data categorizations and policies as well. An approach in accordance with various embodiments can utilize a policy migration service, or other such system, service, or component, to enforce existing policies by the resources 114 of the resource provider environment to ensure compliance, security, and IT governance, among other such aspects. Such a service can also ensure polices move with data as the data object(s) moves outside of the resource provider environment. While the functionality will be described as being provided, at least in part, by the policy import/export engine 220, it should be understood that alternative components can be used to provide such a service, as may be part of, or separate from, the resource provider environment. With hybrid storage deployments, users (or customers of the resource provider) may freely move their data between the on-premises storage devices 210 and the data stores 116 of the resource provider environment 106. As users use policies to manage and curate their data on-premises, these policies need to move with the data to the cloud or other such environments. The same restriction applies as data is moved across buckets and otherwise within the resource provider environment 106. The policy import/export engine 220 enables customers to specify the existing policies along with a data object as the data object moves across trusted boundaries 204, 216 to the cloud. This also applies to data moving out of the resource provider environment 106, where the policies that apply to the data object again need to move with the object. Additionally, the resource provider environment 106 can ensure that the policy being specified by the user is secure and has not been improperly modified. Such functionality provides at least some protection against 'man in the middle attacks,' as well as a way for the user to trust the policy after the policy has been provided to the resource provider environment 106. An example would be to 'sign' the policy and later validate the signature to ensure the proper policy has been applied to the object. In order to enable policies to be specified and imported into various embodiments, it is desirable in at least some embodiments to standardize the tags, policies, and classifications, or at least ensure that the format for specifying the policy for a given object is easy to specify and publically documented. Furthermore, the resource provider environment 106 should be configured to be able to handle situations where the policy specified with an object cannot be applied, and place a hold on that data or perform another appropriate action.

In addition to policy migration, in at least some embodiments the chain of custody of the data object is migrated with data as well. The chain of custody in some embodiments includes a detailed audit log/trail of actions performed on the data, as well as tags and policies that govern how the data is managed on the storage platform. The resource provider environment can thus provide a way to import and export the chain of custody along with the policies that apply to the data. Most compliance mandates, such as payment card industry (PCI) and health insurance portability and accountability act (HIPPA) mandates, require enterprises to maintain immutable logs of all actions performed on sensitive data for long periods of time. The detailed audit log of all actions, policies, tags, and interactions forming the 'chain of custody' for a data object can help to track the information lifecycle for the object. According to one International Data Corporation (IDC) study, it is not uncommon to see three to twenty or more copies of production data for backup cycles, business continuance, development test, and data mining. Considering an object that is moved to the resource provider environment 106 in bucket 'A' from an on-premises storage device 210 of the user environment 202, that data object can be copied to a secondary bucket 'B' in the resource environment 106, and the policies on the data object can be edited. In order to maintain the 'chain of custody' for this data object, a detailed log of all actions on the object as well as the policies that govern the object need to be maintained. Looking at the data object in bucket 'B', an auditor should be able to track all actions performed on the object in the on-premises storage appliance, in bucket 'A,' as well as bucket 'B'. These actions include changes to the tags and policies applied to the data.

In addition to ensuring that the relevant policy migrates with a data object as the data object moves to the cloud, the resource provider environment 106 can also ensure that the chain of custody migrates with the data as well. A data object may live on an on-premises storage device 210 for years. The audit log and history of all actions performed on the data object and its policies can be lost as this data moves to the resource provider environment 106. The resources 114 of the resource provider environment thus need to provide users with a way to securely import the audit log and history for the data, in order to maintain the chain of custody for the data. This process also applies for moving a data object out of the resource provider environment. The resource provider environment can provide users a way to obtain the policies, as well as the audit logs, in a standardized format. As the chain of custody is handed over to the resource provider environment from trusted partners, the resource provider environment 106 should be able to validate that the chain of custody is secure and has not been tampered with.

Figure 3:
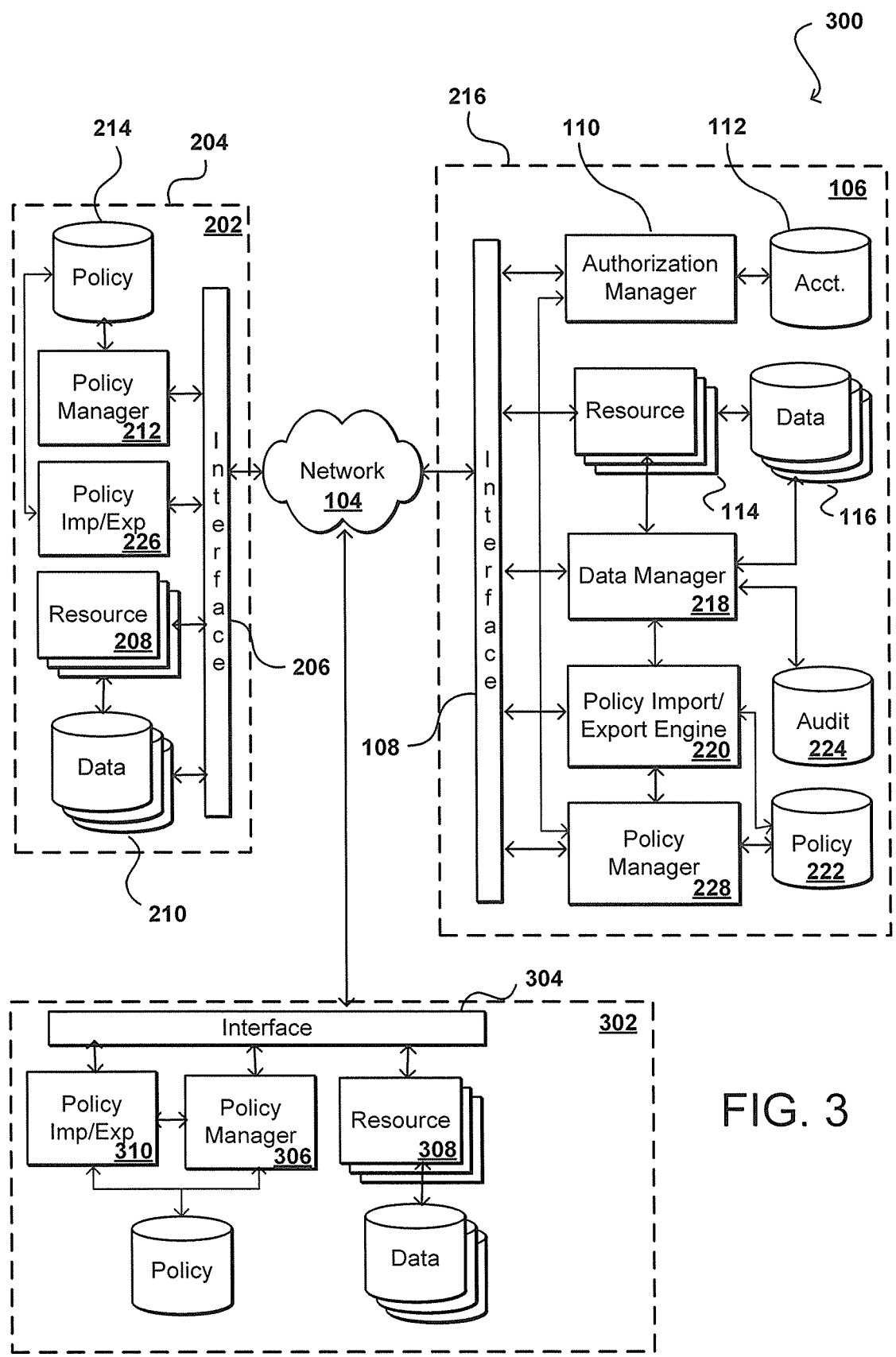
FIG. 3 illustrates an example environment where the resource provider environment can function as an intermediary for data transmitted between a first customer environment and a second customer environment that can be utilized in accordance with various embodiments.

In addition to trusted partners, the data may be passed from the resource provider environment to a third party environment 302 associated with a third party, as illustrated in the example situation 300 of FIG. 3. In this example, the user may want to enable the third party to obtain a copy of a data object that was originally stored in the on-premises storage devices 210 of the user environment 202. As discussed, the data object could have been transferred to the data storage resources 116 of the resource provider environment, along with the classifications, tags, policies, and chain of custody in at least some embodiments. As discussed, the policy import/export engine 220 (or another appropriate component, system, or service) can determine the appropriate tags, policies, classifications, and other appropriate information for a data object, and cause that information to be stored to an appropriate location (such as a policy data store 222 or audit log data store 224) while remaining associated with the received and stored data object. The ability to utilize these policies enables the resource provider environment to function as a trusted intermediary for policies. In the event that a data object from the user, stored in the resource provider environment, is to be transferred to the third party environment 302, the policy associated with the data object by the user can be enforced against violation by the third party by the import/export engine, or other appropriate component(s), of the resource provider environment 106. This can include policies to, for example, not transfer the data object outside of a specified country, even if the third party would normally perform such an export. In addition to the conventional resources 308 and interface layer 304 of the third party environment 302, the third party environment can include a policy manager 306, policy import/export engine 310, and/or other such component for performing tasks such as receiving and managing the policies, tags, chain of custody, and other information associated with a received data object in at least some embodiments.

Figure 4A:
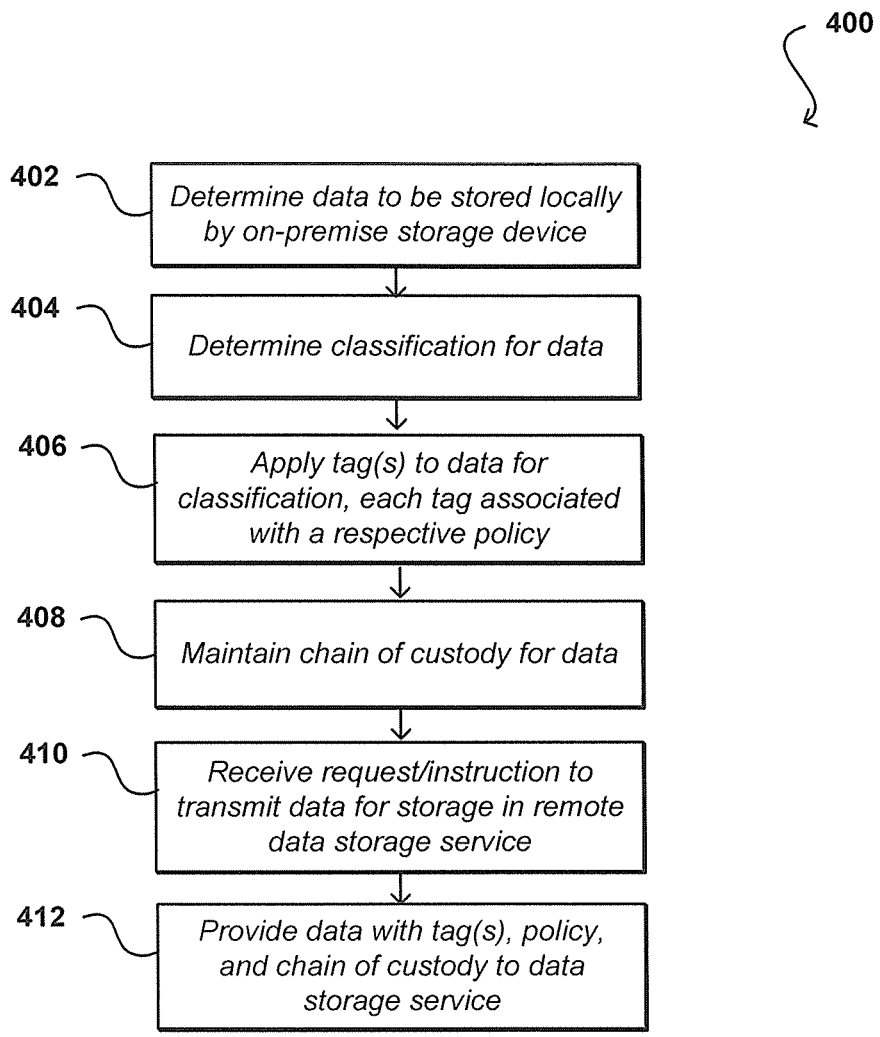
FIGS. 4A, 4B, and 4C illustrate portions of an example process for applying policies to a data object that can be utilized in accordance with various embodiments.

FIG. 4A illustrates a first portion 400 of an example process for causing a policy to be maintained with a data object that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, in which the portion occurs in a user or customer environment, data to be stored locally by an on-premises storage device is determined 402. This can be a manual determination or automatic determination, as may be determined by an application executing in the user environment. A classification for the data can also be determined 404. The classification can be determined automatically or based upon predicates for the data, such as may be based in part upon the filename, date, or other metadata, that is applied to the data object (or policies) during storage and/or transmission of the data, among other such options. The predicate can be defined as one or more actions that can be taken on a data object, such as a READ, WRITE, PUT, or GET, among other such actions. Based at least in part upon the classification of the data, one or more tags can be applied 406 to the data. Each tag can function as an identifier that points to, is indicated by, or is otherwise associated with a policy that governs who should have access to the data, where and how access should be granted, what type of access should be granted, how the data can be used, and/or other such actions. Each policy can be written using a standardized policy language (or otherwise standardized), for example, that can be understood by various environments or services receiving the policy. The policy can then be associated with the data, either through an associated maintained in the user environment or by inserting the policy into the data object with the tag, among other such options. In some embodiments a policy server can be contacted using the information from the tag to determine the appropriate policy, which can then be obtained from a central policy repository or other such location. As the data is stored locally, chain of custody data can be maintained 408 for the data. The chain of custody can include records for any changes related to the data, such as a change in tag, policy, or classification, access to the data, movement of the data, etc. The ability to support such determinations can be performed natively in the user environment, as well as other environments, such that once the data is classified the data can be handled appropriately, and automatically, without user intervention.

A request (or instruction) to transmit the data for storage by a remote data storage service (or other resource provider environment) can be received 410. This can be from within, or from outside, the user environment. If received from outside the environment, an authorization or other such procedure may be performed before initiating the transfer. If it is determined that the data can be transferred for storage, the data can be provided 412 along with the corresponding tag, policy, and chain of custody. Other information such as classification and predicates can also be provided in some embodiments. This information can be embedded in the data object in some embodiments, while in other embodiments the data object may be transferred in a wrapper or "envelope" that includes the policy and chain of custody, with the tag being included in a header of the data object or other such location. In some embodiments the policy may not be included, with the recipient either already having a copy of the standardized policy or being able to request a copy if not already stored. In any case, the data object should be configured such that the policy moves with the data object, in at least some embodiments, such that the policy does not get "lost" as the data is moved or stored in various locations. Further, the chain of custody or audit log should remain with the data object as well. As long as the entity storing the data is trusted, the chain of custody and policy should ensure the integrity and proper use of the data, to the extent practical in such a system. Once the data is transferred to another party the ability to enforce the policy on that party can be limited as discussed elsewhere herein.

Figure 4B:
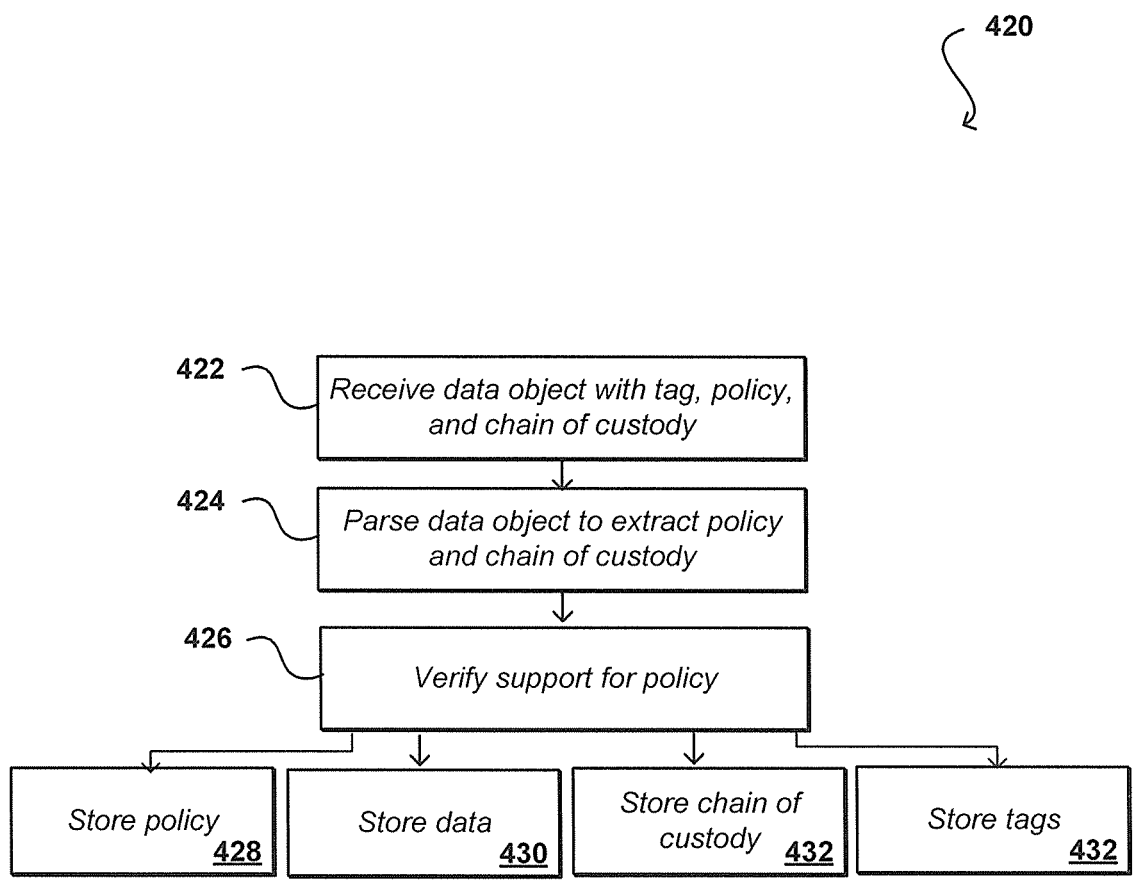

FIG. 4B illustrates a second portion 420 of the example process that can be performed in accordance with various embodiments. In this portion, which is performed by a data storage service or resource provider environment, for example, a data object is received 422 that includes the appropriate data, as well as at least a tag, a policy, and a chain of custody. As discussed, portions of this information may be contained in an envelope used to wrap the data object during transmission, and other information may be included as well, such as classification or predicate data, among other such options. The data object can be parsed 424, such as by a policy import/export engine, in order to extract the policy and chain of custody information. Before performing any further action, support for the policy in the environment or service can be verified 426. If the service or environment, or at least a bucket or repository to receive the data, is not able to support or enforce the policy, the data object may not be stored by the environment and an error message or other notification sent to the owner of the data (i.e., in the user environment). This can include ensuring that the policy for the data object does not conflict with any other policy in the resource environment. If there are multiple policies, such as a bucket policy, access control list policy, and a user policy, for example, the data object policy must not conflict with any of those policies. If the policy is supported and any other criteria are met, the policy can be stored 428, the data can be stored 430, the chain of custody data stored 432, and the tag(s) stored 432 in the resource environment. These storing steps are shown in parallel as the information can be stored in the same or different locations, such as where the policy is stored to a policy repository to be managed by a policy enforcement engine or other such component or system. The information can also be stored to a single repository in other embodiments. Where the information is stored separately, the relationships between the various information can be maintained as discussed elsewhere herein.

Figure 4C:
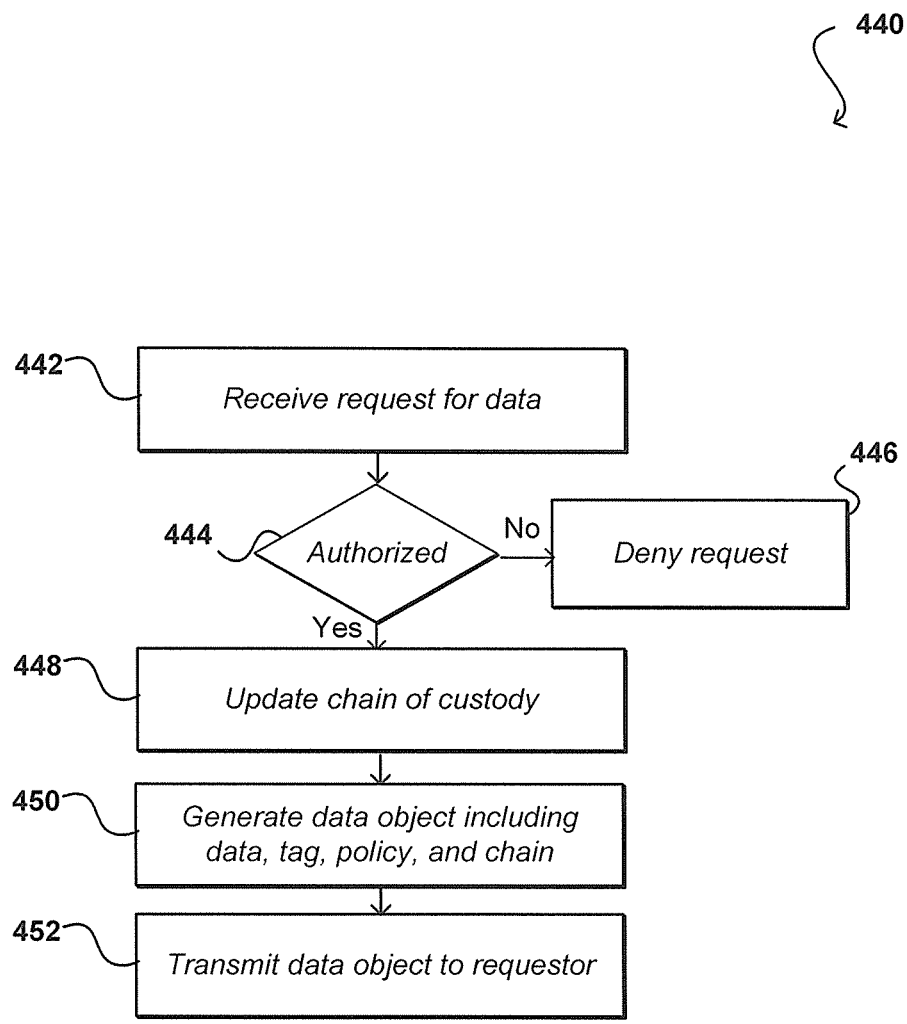

FIG. 4C illustrates a third portion 440 of the example process that can be performed in accordance with various embodiments. In this portion, which also can be performed by a data storage service or resource provider environment, for example, a request for at least a portion of the data is received 442 to the resource provider environment. A determination can be made 444 (in at least some embodiments) as to whether the requestor is authorized to access and/or receive the data (or perforin another such action). If not, the request can be denied 446. If the request is granted, the chain of custody information can be updated 448. As mentioned, a chain of custody can be maintained for all actions on the policies, tags, and objects, and needs to be immutable in at least some embodiments. While the timing of the update can vary, in at least some embodiments the updating will occur before the data is transmitted as the chain of custody information will travel with the data object. In response to the request, a data object can be generated 450, or located if the data object is stored with all the necessary information in the data storage service. As discussed, this can involve working with a policy enforcement engine, policy import/export engine, or other such component(s) to ensure that the appropriate policy and other information is located and attached to the data. The data object can then be transmitted 452 to the requestor. As mentioned, in some embodiments information about the requesting party (if not the user) can be determined to ensure that the requestor is trusted to enforce the policy on the data.

Figure 5:
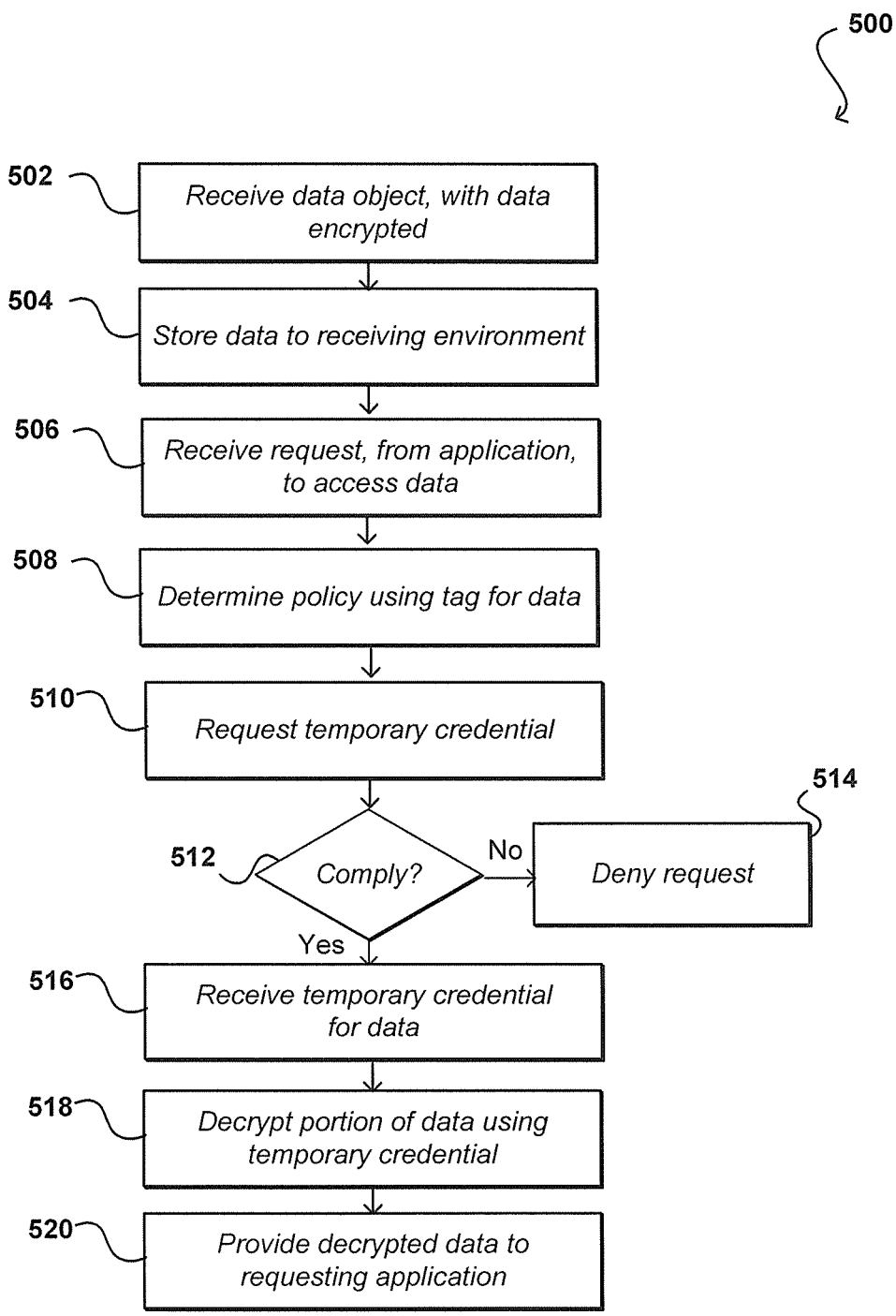
FIG. 5 illustrates an example process for decrypting a data object that can be utilized in accordance with various embodiments.

In some embodiments, the transmission of the data object may not provide the recipient with unlimited access to the data. The recipient might have access rights to the data, but may be limited in the type of access or use of the data. Accordingly, FIG. 5 illustrates an example process 500 wherein the access to the data is restricted even when the recipient has a copy of the data object. In this example, a data object is received 502 where the data is encrypted, or received in ciphertext form. In some embodiments all of the contents of the data object may be encrypted, while in other embodiments only a portion of the data object may be encrypted, such as the data payload portion and/or chain of custody, while the other information (in an envelope or otherwise) remains unencrypted. This enables the tag and/or policy data to be determined, which can help the recipient to determine actions that can be taken on the data or any access or use restrictions on the data, among other such determinations. The data, in ciphertext form, can then be stored 504 to the receiving environment. Subsequently, a request for access to the data can be received 506 from an application or other such source in the receiving environment. Using the tag for the data, the appropriate policy can be determined 508 for access to the data. A temporary credential (e.g., a key that expires after a period of time) can be requested 510, such as from the resource provider environment, the user environment, or a key management service, among other such options. A determination can be made 512 as to whether or not the receiving environment and/or requesting application complies with the policy. In at least some embodiments the application must provide information regarding the intended use of the data. The user environment and/or source of the temporary key can then determine, based at least in part upon the intended use, geographical data, authorization data, and/or other such information, whether the use complies with the policy such that the temporary credential should be issued. The criteria for issuing the credential and allowing the access also can be governed by a policy that operates at a different functional level than the data object policy. If the requested use and/or access does not comply with the policy, the request can be denied 514 (or never submitted in the case where the receiving environment can perform the determination). If the intended use and access complies with the policy, the temporary credential can be received 516. In some embodiments the temporary credential can be received to an intermediate application or component in the receiving environment that is able to unwrap or otherwise obtain the appropriate temporary credential without exposing the credential to the rest of the receiving environment. The intermediate application can then decrypt 518 at least a portion of the data using the temporary credential, and then provide 520 the decrypted data to the requesting application. This can result in, for example, a user being able to play a media file through a media player application when the current location and/or use satisfies the policy. If the current location or use changes so as to no longer comply with the policy, a temporary password will not be received and the media player will be unable to receive the decrypted data for purposes of playback. While a user receiving the decrypted data can potentially capture the decrypted data such that decrypting of the data object is no longer necessary, such usage still provides some level of control over the usage of the content and enforcement of the policies. Because the temporary password is only provided to a trusted recipient, the risk of unintended use of the data can be minimized. In some embodiments the temporary credential expires after a period of time, while in other embodiments a message can be sent when the data is done being provided (such as when a movie or song is done streaming) whereby that credential is no longer valid and a new temporary password must be obtained. The data can be stored in ciphertext, and not accessed when the policy is not being complied with and a temporary credential cannot be received. If the data object subsequently complies with the policy again, a temporary password can be issued (except in situations where the intermediate non-compliance, as may be reflected in the chain of custody, prevents such access). It should be understood, however, that in some embodiments the media player (or other such application) can request and obtain the temporary credential for playback or access without going through an intermediate application as discussed above.

In some embodiments, the providing of data in cleartext or ciphertext can depend at least in part upon the environment of the requestor. For example, if the data is stored in a resource provider environment and the request is received from within the resource provider environment, such that the data will not pass beyond a trusted boundary, the data can be decrypted and provided in cleartext. If the request will cause the data to pass beyond the trusted boundary, the data can be sent in ciphertext.

As mentioned, it can be desirable in at least some embodiments to create a standard for the tagging and creation of policies, with standardized resource characteristics, etc. There may be various levels of compliance or support, where a requestor must have the appropriate level in order to be able to receive or access the data, or perform certain actions with respect to the data. Further, the policies provided might not be a bound on the types of use permitted, but a restriction as to certain prohibited uses. For example, the data might be able to be used for any purpose within a trust boundary except to print a copy of the data or generate a copy of the data. Further, the data might not be able to be copied to any location that does not support the policies. There also can be different policies at different levels. For example, there can be policy at the account level, a different policy at the bucket level, and yet another applicable policy at the data object level. As mentioned, there can be unique policies applied to each object, or policies can apply to various classifications of objects or objects including a similar tag. Further, each object can store its own policy or policies can be maintained in a central policy repository, among other such options.

As mentioned, there can be various triggers for a data object as well. There may be various tags defined for a data object, with each specifying a different policy for a different type of operation. When doing a PUT or GET operation, for example, the requestor can specify a policy and one or more triggers. When storing the data object to a resource provider environment, for example, the triggers can be stored with the tags and policies. While a tag is generally an identifier for a policy (or the target of a policy), a trigger refers to an action that can be taken on a data object. Thus, it can be desirable to store information for various triggers as well, as different tags or policies can apply for different actions. For example, a different set of criteria might apply to be able to store data than to read or modify stored data. These can be different triggers, which can each correspond to a different tag and/or policy. In at least some embodiments, as discussed above, a requestor has to provide some information about the intent for the data, which can determine which trigger (and thus which policy) to apply. If a user intends to read the data then one trigger might apply, while a user wanting to print out a copy of the data might have another trigger apply. There can be standard ways of enabling a user to express what they intend to do with the data, and there can be a standardized way to respond to those requests as well.

In some embodiments, it can be desirable to determine the source of a data object before storing the data object to an environment or performing another such action. In some embodiments a request to PUT an object to a data repository in an environment can be signed, using a digital signature, to ensure the source of the data, as well as the fact that that data likely has not been compromised by a "man in the middle" or other intervening party. Particularly for situations such as audit or compliance determinations, it can be necessary to show that the data was not modified between the sender and the recipient. Various types of authentication can be used to verify the authenticity of a certificate, as well as that the data signed with that certificate was not modified. When a data object with a tag is received, it can thus be determined that the object came from a trusted partner and that the policy can be enforced without concern. Not every aspect of the data object needs to be signed, as long as the tag (and potentially the audit log) is part of the signature in at least some embodiments.

In addition to certain types of access for performing certain types of actions with respect to the data of the object, different types of access can enable different actions to be performed with respect to the data object itself. This can include, for example, the ability to modify or update the tags or policies associated with the data object, specify new triggers, or perform other such actions. As mentioned previously, any such change can be reflected in the audit log or chain of custody. The access control can be specified by a policy in some embodiments, which can reside at a higher level than the use policy for the data object. Different policies at different levels of a level hierarchy can allow different policy criteria and actions to be applied at different levels of the hierarchy, such as at the bucket level, account level, or user level, among other such options.

Figure 6:
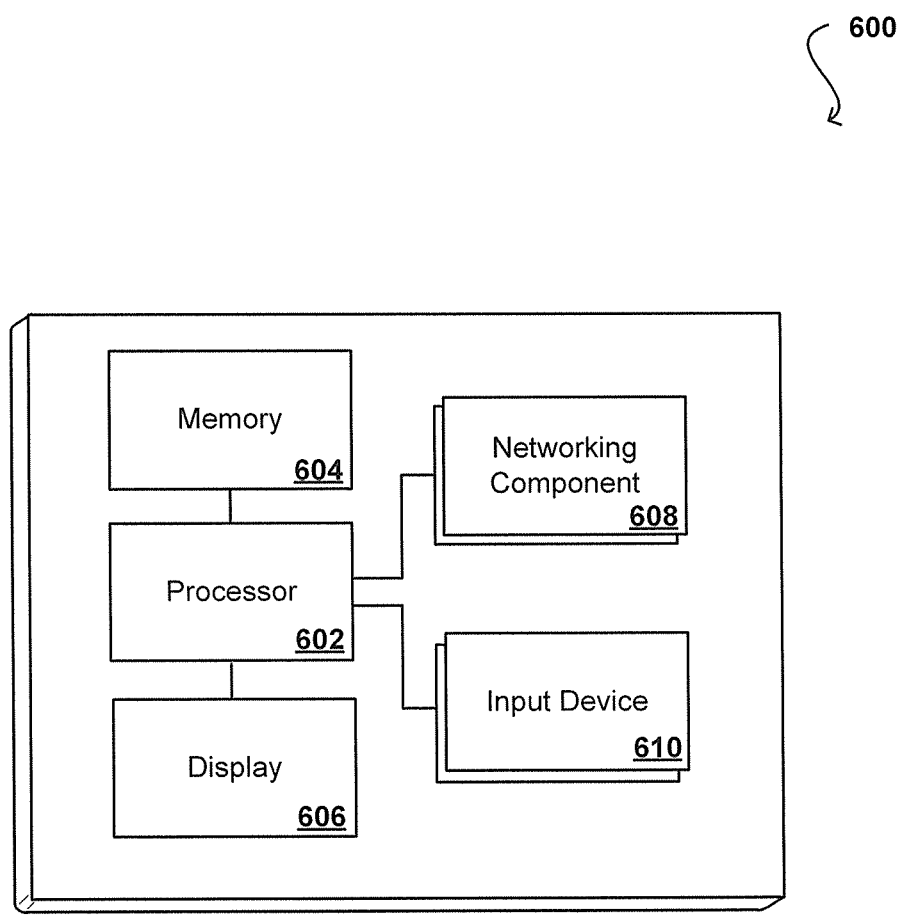
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising: at least one processor; and memory including instructions that, when executed by the at least one processor, cause the system to:
   receive, to a resource provider environment, a first data object from a user environment, the first data object including user data, a data tag, a policy, and an audit log, the data tag corresponding to the policy applicable for the user data within the user environment, and the policy comprising a trigger;
   causing the policy to be applied to the first data object in the user environment based at least in part on the trigger, the audit log including a history of events relating to the user data, the resource provider environment including a plurality of data repositories available over a network;
   determine that the policy is supported by and is free of conflicts from other policies of the resource provider environment;
   upon the determination, cause the user data, the policy, the data tag, and the audit log to be stored to at least one data repository of the plurality of data repositories in the resource provider environment;
   receive a request for at least a portion of the user data; determine that a source of the request is authorized to receive the user data;
   add information for the request to the audit log for the user data;
   generate a second data object including the user data, the data tag, the policy, and the audit log; and
   send over the network the second data object to a destination specified by the request.

2. The system of claim 1, wherein the first data object includes a set of tags, each tag of the set corresponding to at least one of: a categorization of the first data object, a respective policy of a set of policies for the first data object, or a respective action capable of being performed with respect to the first data object.

3. The system of claim 2, wherein the instructions when executed further cause the system to:

determine, from the request, an intended action to be performed with respect to the user data, wherein determining that the source of the request is authorized to receive the user data includes determining whether a corresponding policy, of the set of policies, allows the intended action to be performed on the user data by the source of the request.

4. The system of claim 2, wherein the instructions when executed further cause the system to:
determine a bucket in the resource provider environment to which to store the user data, the user data being stored separately from the policy; and
determine at least one bucket policy associated with the bucket,
wherein determining that the policy is free of conflicts from other policies of the resource provider environment includes determining that neither the user data nor the policy violate any bucket policy of the at least one bucket policy associated with the bucket.

5. A computer-implemented method, comprising:
receiving a data object from a first environment to a second environment, the second environment provided by a different entity than the first environment, the data object including data and a policy for managing access to the data within the first environment, the second environment including a plurality of data repositories available over a network and the policy comprising a trigger;
causing the policy to be applied to the data object in the second environment based at least in part on the trigger;
determining that the policy is supported by and is free of conflicts from other policies of the second environment; storing the data and the policy to the second environment in at least one data repository of the plurality of data repositories;
enforcing access to the data in the second environment per the policy; and
upon the determination, adding information to an audit log for the data in response to access or actions taken with respect to the data, wherein an updated data object including the data, the policy, and the audit log is generated in response to adding the information to the audit log.

6. The computer-implemented method of claim 5, further comprising:
receiving a request for at least a portion of the data;
determining that a source of the request is authorized, per the policy, to receive the data;
adding information for the request to the audit log for the data;
generating a second data object including the data, the policy, and the audit log; and
sending the second data object to a destination specified by the request.

7. The computer-implemented method of claim 6, further comprising:
extracting the policy and the audit log from an envelope of the data object, the data and a data tag included in the envelope, wherein generating the second data object further includes placing the data in a second envelope and including the policy and the audit log in the second envelope.

8. The computer-implemented method of claim 5, further comprising:
causing the policy to be stored to a policy repository managed by a policy engine, the policy engine responsible for enforcing the policy in the second environment, a set of policies stored to the policy repository each corresponding to a standardized policy format.

9. The computer-implemented method of claim 5, further comprising:
determining that the policy is immutable; and
preventing modification of the policy or specification of a new policy for the data.

10. The computer-implemented method of claim 5, further comprising:
receiving a request to modify the policy, the policy being mutable;
determining that a source of the request is authorized to modify the policy;
updating the policy per the request; and
updating the audit log to reflect modification of the policy.

11. The computer-implemented method of claim 5, further comprising:
storing a set of policies received with the data object, wherein a corresponding policy to enforce from the set of policies is based at least in part upon an expressed intended action to be performed with respect to the data.

12. The computer-implemented method of claim 5, further comprising:
storing, in the second environment, either (1) a respective policy for each data object stored in the second environment or (2) a set of standardized policies which tags for data objects stored by the second environment can identify.

13. The computer-implemented method of claim 5, further comprising:
causing the policy to remain associated with, and enforced on, the data regardless of movement of the data within the second environment.

14. The computer-implemented method of claim 5, further comprising:
verifying a digital signature on the policy before enforcing the policy on the data in the second environment.

15. The computer-implemented method of claim 5, further comprising:
receiving a request for the data by an application in the first environment or a third environment;
generating a second data object including the data, the policy, and the audit log, the data being encrypted under a credential available to the second environment;
sending the second data object to a destination specified by the request;
receiving a subsequent request to access the data included in the second data object;
determining, based on information for the subsequent request, that an intended use for the data complies with the policy; and
providing a temporary credential enabling the data to be decrypted for a period of time.

16. The computer-implemented method of claim 15, wherein the temporary credential is provided to an intermediate application configured to decrypt the data using the temporary credential and provide decrypted data to the application associated with the request.

17. A non-transitory computer-readable storage medium including instructions that, when executed by at least one processor of a computer system, cause the computer system to:
determine a classification and at least one predicate for user data stored in a user environment, the at least one predicate relating to an action capable of being performed with respect to the user data within the user environment;

determine, based at least in part upon the classification and the predicate, at least one data tag to be associated with the user data, a data tag of the at least one data tag associated with a policy of at least one policy for the user data within the user environment, the policy comprising a trigger;

cause the policy to be applied to the user data in the user environment based at least in part on the trigger;

determine that the policy is supported by and is free of conflicts from other policies of the second environment;

upon the determination of the policy is supported and is free of conflicts, send a request to transmit the user data for storage in a data repository of a remote environment operated by a separate entity, the remote environment including a plurality of data repositories available over a network;

generate a data object including at least the user data and the at least one policy;

and transmit the data object to the remote environment.

18. The non-transitory computer-readable storage medium of claim 17, wherein the instructions when executed further cause the computer system to:
generate an audit log for the user data, the audit log containing information regarding changes and access to the user data; and
include the audit log in the data object transmitted to the remote environment.

19. The non-transitory computer-readable storage medium of claim 18, wherein:
the audit log further includes information regarding changes and access to the at least one policy and the at least one data tag.

20. The non-transitory computer-readable storage medium of claim 17, wherein the instructions when executed further cause the computer system to:
specify whether each tag associated with the user data is mutable or immutable, a mutable tag modifiable only by a trusted and authorized entity.

\* \* \* \* \*